(12) United States Patent
Kapeliouchko et al.

(10) Patent No.: US 7,297,744 B2
(45) Date of Patent: Nov. 20, 2007

(54) PROCESS FOR PREPARING FLUOROPOLYMER DISPERSIONS

(75) Inventors: Valeri Kapeliouchko, Alessandria (IT); Marco Malvasi, Alessandria (IT)

(73) Assignee: Solvay Solexis S.p.A., Milan (IT)

( * ) Notice: Subject to any disclaimer, the term of this patent is extended or adjusted under 35 U.S.C. 154(b) by 230 days.

(21) Appl. No.: 10/968,048

(22) Filed: Oct. 20, 2004

(65) Prior Publication Data
US 2005/0107506 A1 May 19, 2005

(30) Foreign Application Priority Data
Oct. 21, 2003 (IT) .................. MI2003A002050

(51) Int. Cl.
*C08L 27/12* (2006.01)

(52) U.S. Cl. .............. 524/544; 523/310; 524/546; 524/379; 524/423; 562/605

(58) Field of Classification Search ............ 524/544, 524/546; 523/310; 562/605
See application file for complete search history.

(56) References Cited

U.S. PATENT DOCUMENTS

| | | | |
|---|---|---|---|
| 2,559,752 A | | 7/1951 | Berry |
| 3,037,953 A | * | 6/1962 | Mitchel et al. ............ 524/546 |
| 3,271,341 A | | 9/1966 | Garrison, Jr. |
| 3,301,807 A | * | 1/1967 | Hoaski ................. 524/376 |
| 3,536,643 A | | 10/1970 | Stryker et al. |
| 3,704,272 A | * | 11/1972 | Holmes et al. ............ 524/376 |
| 4,369,266 A | | 1/1983 | Kuhls et al. |
| 4,380,618 A | | 4/1983 | Khan et al. |
| 4,864,006 A | | 9/1989 | Giannetti et al. |
| 4,990,283 A | | 2/1991 | Visca et al. |
| 5,789,508 A | | 8/1998 | Baker et al. |
| 5,858,467 A | | 1/1999 | Lenti et al. |
| 6,136,893 A | | 10/2000 | Yamashita et al. |
| 6,169,139 B1 | * | 1/2001 | van Cleeff ............. 524/544 |
| 6,297,334 B1 | | 10/2001 | Marchese et al. |
| 6,479,591 B2 | | 11/2002 | Kapeliouchko et al. |
| 6,518,352 B1 | | 2/2003 | Visca et al. |
| 6,576,703 B2 | | 6/2003 | Kapeliouchko et al. |
| 6,720,437 B2 | * | 4/2004 | Jones et al. ............. 554/191 |
| 6,956,078 B2 | * | 10/2005 | Cavanaugh et al. ....... 524/378 |

2003/0153674 A1 8/2003 Visca et al.

FOREIGN PATENT DOCUMENTS

| | | |
|---|---|---|
| DE | 100 18 853 A1 | 10/2001 |
| EP | 0 194 690 A2 | 9/1986 |
| EP | 194690 A2 * | 9/1986 |
| EP | 1 155 055 B1 | 12/1999 |
| EP | 1526142 A1 * | 10/2004 |
| EP | 1 574 527 A1 | 9/2005 |
| WO | WO 03/051988 A2 | 6/2003 |
| WO | WO 03/078479 A1 | 9/2003 |
| WO | WO-3/078479 A1 * | 9/2003 |

OTHER PUBLICATIONS

Martin J. Schick, Marcel Dekker Inc., New York 1967, "Nonionic Surfactants", pp. 76-85; 103-141 and 570-583.
Kirk-Othmer, John Wiley & Sons, "Encyclopedia of Chemical Technology", vol. 14, pp. 737-783, 1995.
Interscience Publishers, New York, NY, 1971, "Encyclopedia of Industrial Chemical Analysis", vol. 1, pp. 339-340.

* cited by examiner

*Primary Examiner*—David W. Wu
*Assistant Examiner*—Henry S. Hu
(74) *Attorney, Agent, or Firm*—Arent Fox, LLP

(57) ABSTRACT

A process for preparing fluoropolymer dispersions, substantially free from anionic fluorinated surfactants, and with a coagulum amount <0.1% by weight, comprising:
a) step a1) addition of:
  a non ionic surfactant having cloud point (CP) between 40° and 80° C., in an amount from 1.5% to 50% by weight on the dispersion fluoropolymer; and
  optionally an electrolyte to bring the specific conductivity of the dispersion to values in the range 130-8,000 μS/cm;
optionally a buffer agent to have a pH between 2 and 12 to a fluoropolymer dispersion obtainable by an emulsion polymerization process;
  step a2):
   heating of the dispersion obtained in a1) up to a temperature $T_c$ in the range CP±10° C.;
   decantation without stirring, at the temperature $T_c$, until obtaining the dispersion separation in two aqueous phases, of which the lower one containing the fluoropolymer is discharged;
b) step b1):
the dispersion obtained in step a2) is optionally additioned of an electrolyte and of a non ionic surfactant as in a1).

27 Claims, No Drawings

PROCESS FOR PREPARING FLUOROPOLYMER DISPERSIONS

The present invention relates to a process for preparing aqueous dispersions of fluoropolymers substantially free from fluorinated surfactants, in particular fluorinated ionic surfactants.

More specifically the present invention relates to a process for preparing aqueous dispersions of fluoropolymers substantially free from perfluorooctanoate in the form of acid or its salts.

With aqueous dispersions of fluoropolyemrs substantially free from fluorinated surfactants it is meant that the content of fluorinated surfactants referred to the fluoropolymer weight is lower than 100 ppm, in particular lower than 50 ppm, more specifically lower than 5 ppm.

It is well known in the prior art that for the production of fluorinated polymers there are two different polymerization methods: the suspension polymerization and the emulsion polymerization.

In the suspension polymerization polymer granules having millimetric sizes are obtained.

In the emulsion polymerization a colloidal aqueous dispersion is obtained having particle sizes from some nanometers, generally 10 nm, to hundreds nanometers, from 100 nm to 400 nm. The emulsion polymerization process of fluoropolymers is carried out with a slow stirring and in the presence of surfactants not acting as chain transfer agent to avoid to obtain fluoropolymers having a low molecular weight and therefore having poor mechanical properties. Said surfactants are called non telogenic surfactants, see, for example, U.S. Pat. No. 2,559,752. Perfluoroalkanoic acid salts, in particular, the ammonium salt and/or alkaline metal salts of the perfluorooctanoic acid, hereinafter indicated as PFOA, are industrially very often used. Other (per)fluorinated anionic surfactants are also used, see for example U.S. Pat. No. 3,271,341, U.S. Pat. No. 4,380,618, U.S. Pat. No. 4,864,006, U.S. Pat. No. 5,789,508.

The PFOA is the most industrially used surfactant in the emulsion polymerization since it is not telogen, thus allowing to obtain fluorinated polymer dispersions having high molecular weight, and it allows to obtain stable dispersions for long periods of time.

It is also known that in the applications of fluoropolymer dispersions, as coating or in the impregnation of glass fibers, said fluorinated surfactants can reach the environment, for example by the washing effluents, or because they disperse in the atmosphere during the drying and/or sintering steps. However some of said surfactants have been classified as harmful for the environment and are characterized by a low bioelimination rate from the human body. For example, the PFOA seems to belong to the surfactants particularly harmful for the environment and with long residence time in men. Therefore there is a request from the users of fluoropolymer dispersions substantially free from fluorinated anionic surfactants, and in particular free from PFOA.

The fluoropolymer dispersions are obtained from the emulsion polymerization process with a fluorinated polymer concentration in the range 20-35% by weight referred to 100 parts by weight of the dispersion.

The fluoropolymer dispersions obtained from the polymerization process can be subjected to post-treatments to obtain concentrated fluoropolymer dispersions, even up to 75% w/w. The concentration processes can be obtained, for example, by a decantation process as described, for example, in U.S. Pat. No. 3,037,953, U.S. Pat. No. 3,704,272 and U.S. Pat. No. 3,301,807. In these patents no reference is made to the PFOA reduction in the obtained fluoropolymer dispersions.

Another concentration process of fluoropolymer dispersions is the so called ultrafiltration process as described, for example, in U.S. Pat. No. 6,136,893 and U.S. Pat. No. 4,369,266. In U.S. Pat. No. 4,369,266 it is described also a variant of the ultrafiltration process, allowing to obtain aqueous dispersions of fluoropolymers substantially free from fluorinated anionic surfactant, for example PFOA. The process is based on the fluoropolymer dispersions dialysis and the permeate is purified from PFOA by using anionic exchange resins. This process can be industrially carried out. The drawback of this process is due to the fact that the dialysis process is slow, in particular to obtain fluoropolymer dispersions having a very low PFOA content, lower than 10 ppm referred to the polymer weight.

It is also known a process for obtaining polymeric dispersions substantially free from PFOA by direct contact of the stabilized dispersion with anionic exchange resins. See for example U.S. Pat. No. 3,536,643, EP 1,155,055, WO 03/051988. This process allows to obtain dispersions substantially free from PFOA with a good productivity, however it has the drawback that a part of fluoropolymer particles can remain in the anionic exchange resins when this process is industrially carried out. This drawback can happen if the stabilized fluoropolymer dispersion results locally unstabilized, for any reason, and therefore with coagulum formation. Or because a physical fluoropolymer trapping takes place. This involves a fluoropolymer loss, and above all it prevents the resin regeneration process with the drawback of the exhausted resins disposal.

In patent application DE 100 18 853 it is described a process for obtaining dispersions substantially free from PFOA by distillation of the dispersion brought to pH between 1 and 3. Said process has the drawback to involve a strong dispersion destabilization and a high probability of coagulum formation. Besides, there is the drawback of the formation of a remarkable amount of foam creating problems in an industrial process.

The need was felt of a process to obtain fluoropolymer dispersions, capable to overcome the inconveniences of the above described processes of the prior art, having the following characteristics:

substantially fluorinated surfactant free, in particular fluorinated anionic surfactants;
  pumpability, in industrial plant pipes by using non critical pressure values for the stability of the dispersion itself;
  containing a coagulum amount <0.1% by weight, preferably <0.01% by weight referred to the polymer weight.

It has been found by the Applicant a process allowing to solve the above technical problem.

An object of the present invention is a process for the preparation of pumpable fluoropolymer dispersions, preferably based on tetrafluoroethylene (TFE) homopolymers or copolymers, substantially free from anionic fluorinated surfactants, and with a coagulum amount <0.1% by weight, preferably <0.01%, still more preferably <0.005% by weight referred to the polymer weight, comprising:

a)

Step a1) addition of:
  a non ionic surfactant having cloud point (CP) between 40° and 80° C., in an amount from 1.5% to 50% by weight, preferably from 2.5% to 30% by weight on the dispersion fluoropolymer; and optionally an electrolyte in an amount such to bring the specific conductivity of the dispersion, measured at 25° C., to values in the range 130-8,000 μS/cm, preferably 250-3,000 μS/cm; and optionally a buffer agent to have a pH between 2 and 12, preferably between 3 and 10, to a fluoropolymer dispersion obtainable by an emulsion or microemulsion polymerization process;

Step a2):

heating of the dispersion obtained in step a1), under stirring, up to a temperature $T_c$ in the range CP±10° C., preferably in the range CP±5° C., CP being the cloud point of the used nonionic surfactant;

decantation without stirring, by operating at the temperature $T_c$, until obtaining the dispersion separation in the following aqueous phases:

a lower phase containing the concentrated fluoropolymer, wherein the fluoropolymer concentration is in the range 40%-75% w/w, preferably 60%-75% w/w, a surnatant phase substantially not containing fluoropolymer;

surnatant separation;

discharge and recovery of the lower phase containing the concentrated fluoropolymer;

b)

Step b1):

the dispersion of the recovered lower phase obtained in step a2), after surnatant separation, is additioned:

optionally, with an electrolyte in an amount such to bring the specific conductivity of the dispersion, measured at 25° C., to values in the range 130-8,000 μS/cm, preferably 250-3,000 μS/cm;

a non ionic surfactant having cloud point (CP) in the range 40°-80° C., and such to be present in the dispersion in an amount from 1.5% to 50% by weight, preferably from 2.5% to 30% by weight on the dispersion fluoropolymer;

optionally, a buffer agent to have a pH in the range 2-12, preferably 3-10;

Step b2):

repetition of the steps indicated in step a2); optionally c)

Step c1):

repetition of step b1) but by using the dispersion obtained in Step b2);

Step c2):

repetition of the steps indicated in step b2).

The fluoropolymer dispersions obtainable with an emulsion or microemulsion polymerization process, generally have the following properties:

particle diameter from 10 nm to 400 nm, preferably from 20 nm to 300 nm, fluoropolymer concentration from 10% to 45% by weight, preferably from 20% to 35%, amount of fluorinated anionic surfactant in the range 800 ppm-10,000 ppm, preferably 1,200 ppm-6,000 ppm referred to the polymer weight.

From the industrial point of view polytetrafluoroethylene (PTFE) dispersions obtainable by an emulsion polymerization process typically have an amount of fluorinated anionic surfactant in the range about 2,500 ppm-about 5,000 ppm, preferably 3,000 ppm-4,000 ppm referred to the polymer weight.

It has been found by the Applicant that when the surfactant amount in the initial fluoropolymer dispersion, obtainable with an emulsion or microemulsion polymerization process, is lower than about 3,000 ppm referred to the fluoropolymer weight, and for fluoropolymer concentrations in the dispersion of about 30% by weight, steps a) and b) are sufficient to obtain fluoropolymer dispersions substantially anionic fluorinated surfactant free. When the surfactant amount in the initial dispersion is higher than about 3,000 ppm referred to the fluoropolymer weight and operating with a fluoropolymer concentration of about 30 by weight, three steps (a)+b)+c)) are necessary.

With pumpable fluoropolymer dispersions, according to the present invention, dispersions are meant running or flowing in industrial plant pipes by using non critical pressure values for the dispersion stability. Generally these pressure values range from 1.5 to 10 bar.

It has been surprisingly and unexpectedly found that with the above process, the fluoropolymer dispersions are substantially anionic fluorinated surfactant free: the amount of said surfactant is lower than 100 ppm referred to the polymer weight. This allows to accomplish an industrial plant.

Preferably the above described invention process comprises besides steps a), b), c), also the following step:

d)

Step d1):

repetition of step c1) but by using the dispersion obtained in

Step c2);

Step d2):

repetition of the steps indicated in step c2).

The fluoropolymer dispersions obtained in step d2) contain an even lower amount of said anionic fluorinated surfactant.

Still more preferably the above invention process comprises, besides steps a), b), c), d) also step e) and optionally the successive step f), to obtain fluoropolymer dispersions containing a few ppm of fluorinated anionic surfactant:

e)

Step e1):

repetition of step d1) but by using the dispersion obtained in

Step d2);

Step e2):

repetition of the steps indicated in step d2)

f)

Step f1):

repetition of step e1) but by using the dispersion obtained in

Step e2);

Step f2):

repetition of the steps indicated in step e2).

In step a2) the surnatant is purified to recover the surfactants, in particular the anionic fluorinated surfactants. This is carried out by treatment with solid adsorbers, preferably anionic exchange resins. All the other surnatants obtained in steps b2), c2), d2), e2), f2) can be subjected to the above process to recover the surfactants.

In steps a1), b1), c1), d1), e1), f1) one or more surfactants can be used so that the surfactant mixture has a CP value in the range indicated in a1). The mixture CP is measured according to the methods mentioned in the Examples.

The nonionic surfactants used in the process of the present invention having cloud point (CP) in the range 40° C.-80° C. are known in the prior art. The book "Nonionic surfactants" Ed. M. J. Schick, Marcel Dekker 1967, pages 76-85 and 103-141 can for example be mentioned. Preferably the nonionic surfactants used in the process of the present invention have a CP from 45° C. to 700° C. Among nonionic surfactants, polyethoxyated alcohols and polyethoxylated alkylphenols are particularly preferred, optionally containing one or more propylene oxide units. The following surfactants are those still more preferred:

Triton®X100 (Dow), having formula:

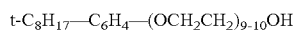
t-$C_8H_{17}$—$C_6H_4$—$(OCH_2CH_2)_{9\text{-}10}OH$

Tergitol®TMN100x (Dow), having formula:

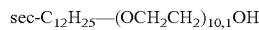
sec-$C_{12}H_{25}$—$(OCH_2CH_2)_{10,1}OH$

Antarox®863 (Rhodia), having formula:

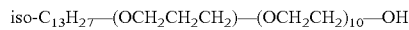
iso-$C_{13}H_{27}$—$(OCH_2CH_2CH_2)$—$(OCH_2CH_2)_{10}$—OH

Rhodasurf®870 (Rhodia), having formula:

iso-$C_{13}H_{27}$—$(OCH_2CH_2)_{10}$—OH

Genapol®X080 (Clariant), having formula:

iso-$C_{13}H_{27}$—$(OCH_2CH_2)_8$—OH.

In the process of the present invention mixtures of nonionic surfactants can be used, provided that the mixture cloud point is within the above limits.

The preferred electrolytes used in the present invention are ammonium salts or hydroxides and/or alkaline metals. The following are still more preferred: ammonium sulphate, ammonium bisulphate, ammonium carbonate, ammonium hydroxide.

The process of the present invention can be used for the purification of fluorinated anionic surfactants also for fluoropolymer dispersions containing more than 10,000 ppm of said surfactants, referred to the polymer weight. In this case the process of the present invention comprises a greater number of phase separation steps.

Among the anionic exchange resins usable in the process of the present invention to purify the supernatant from fluorinated anionic surfactants, there can be mentioned the anionic exchange resins described in "Kirk-Othmer-Encyclopedia of Chemical Technology" vol. 14, pages 737-783, J. Wiley & Sons, 1995. Among the preferred anionic exchange resins there can be mentioned the resins containing a tertiary or quaternary ammonium group. Among the preferred commercial resins, Amberjet®4400 OH (Rohm&Haas) and Dowex®MSA 1-C (Dow) can be mentioned.

As other usable solid adsorbers, one can mention active carbons, alumina, silicas, inorganic hydroxides having low solubility in water, for example magnesium and calcium hydroxide.

Among the buffer agents usable in the process of the present invention, there can be mentioned the well known organic or inorganic buffer systems of the prior art as those formed of a weak acid in the presence of one of its salts with a strong base, as $CH_3COOH/CH_3COONa$, $NaHCO_3/Na_2CO_3$, or those formed of a weak base in the presence of one of its salts with a strong acid, for example $NH_4OH/NH_4Cl$.

The polymerization processes to obtain the dispersions usable in the process of the present invention are the emulsion or microemulsion polymerization processes.

The emulsion polymerization processes are described in the following patents: U.S. Pat. No. 2,559,752, U.S. Pat. No. 4,380,618, U.S. Pat. No. 5,789,508, U.S. Pat. No. 6,479,591, U.S. Pat. No. 6,576,703 and in the patent application U.S. 2003/0153674.

The microemulsion polymerization processes are described in the following patents in the name of the Applicant: U.S. Pat. No. 4,864,006 and U.S. Pat. No. 6,297,334.

The microemulsions usable in the microemulsion polymerization processes are described in U.S. Pat. No. 4,864,006 and U.S. Pat. No. 4,990,283.

The dispersion fluoropolymers used in the process of the present invention are for example:

tetrafluoroethylene (TFE) homopolymers and TFE copolymers with monomers having at least one unsaturation of ethylene type;

thermoprocessable fluoropolymers (from the melt) based on TFE as PFA, MFA, FEP and ETFE;

VDF-based homopolymers and copolymers;

CTFE-based homopolymers and copolymers, for example PCTFE and E/CTFE copolymer;

VDF-based fluoroelastomers;

VDF/HFP, optionally containing TFE and/or vinylethers selected from perfluoroalkylvinylethers and/or perfluoroalkoxyalkylvinylethers; optionally containing hydrogenated olefins as ethylene and propylene;

TFE-based (per)fluoroelastomers:

TFE copolymers with vinylethers selected from perfluoroalkylvinylethers and/or perfluoroalkoxyalkylvinylethers; in particular TFE/PMVE, TFE/PEVE, TFE/PPVE;

TFE copolymers with hydrogenated olefins, preferably ethylene and/or propylene;

TFE and/or VDF amorphous and/or crystalline fluoropolymers containing dioxole rings having 5-7 atoms, in particular those obtained by copolymerization with (per)fluorodioxcles or with dienic monomers giving dioxole rings by cyclization.

The copolymers of tetrafluoroethylene (TFE) with monomers having at least one unsaturation of ethylene type comprise comonomers of hydrogenated and fluorinated type. The comonomer amount is preferably lower than 3% by weight, preferably lower than 1% to have non thermoprocessable copolymers (the so called modified PTFE).

Among the hydrogenated comonomers it can be mentioned ethylene, propylene, acrylic monomers, for example methylmethacrylate, (meth) acrylic acid, hydroxyethylenacrylate, styrene monomers, as, for example, styrene.

Among the fluorinated comonomers there can be mentioned:

$C_3$-$C_8$ perfluoroolefins, as hexafluoropropene (HFP)

$C_2$-$C_8$ hydrogenated fluoroolefins, such as vinyl fluoride (VF), vinylidene fluoride (VDF), trifluoroethylene, $CH_2$=CH—$R_{f0}$ perfluoroalkylethylene, wherein $R_{f0}$ is a $C_1$-$C_6$ perfluoroalkyl;

$C_2$-$C_6$ chloro- and/or bromo- and/or iodo-fluoroolefins, as chlorotrifluoroethylene (CTFE);

$CF_2=CFOR_{f0}$ (per) fluoroalkylvinylethers (PAVE), wherein $R_{f0}$ is a $C_1$-$C_6$ (per)fluoroalkyl, for example $CF_3$, $C_2F_5$, $C_3F_7$;

$CF_2=CFOX_0$ (per)fluoro-oxyalkylvinylethers, wherein $X_0$ is a $C_1$-$C_{12}$ alkyl, or a $C_1$-$C_{12}$ oxyalkyl, or a $C_1$-$C_{12}$ (per)-fluorooxyalkyl having one or more ether groups, for example perfluoro-2-propoxy-propyl;

fluorodioxoles, preferably perfluorodioxoles.

The preferred fluoropolymers of the dispersions obtainable by emulsion or microemulsion polymerization, usable in the process of the present invention, are the TFE copolymers or the PTFE homopolymers.

The initial dispersion can be mono- bi- or multimodal. For the bi- and multimodal dispersions see for examples U.S. Pat. No. 6,576,703, U.S. Pat. No. 6,518,352 in the name of the Applicant.

The process of the present invention is characterized by a high efficiency and substantially without fluoropolymer losses.

The fluoropolymer dispersions essentially free from fluorinated anionic surfactants obtained with the process of the present invention are characterized by a good stability to shear and can be used in the usual applications foreseen for this kind of compositions. The dispersions obtained with the invention process, as such or formulated, can also be used for the coating of surfaces of organic and/or inorganic polymers, of metals or ceramics; for the glass fiber impregnation, the cast film production, for the additivation of polymers or inorganic materials etc.

Without being bound to any theory, researches carried out by the Applicant have shown that the concentration process by decantation takes place through a reversible flocculation mechanism. It is well known that the flocculation reversibility strongly depends on the presence of a fluorinated anionic surfactant generating an electrostatic repulsion potential among the fluoropolymer particles. The skilled in the art would have expected a partial or complete irreversibility of the invention process with consequent coagulum formation as the fluorinated anionic surfactant is reduced in the dispersion. It has been surprisingly and unexpectedly found by the Applicant that with the process of the present invention, concentrated dispersions of fluoropolymers can be prepared substantially free from fluorinated anionic surfactants without formation of significant amounts of coagula <0.1% by weight, preferably <0.01% by weight, still more preferably <0.005% by weight, referred to the fluoropolymer. Besides, the dispersions obtainable with the process of the present invention result pumpable, whereby the industrial use of the invention process does not show any inconvenience.

The following Examples illustrate with non limitative purposes the present invention.

EXAMPLES

The percentages reported in the Examples are percentages by weight

Determination of the Average Particle Diameter in the Latex

The average particle diameter is determined by an instrument based on laser light diffusion, in particular on Photon Correlation Spectroscopy, equipped with Brookhaven correlator model 2030 AT and Argon Laser light source having a wave length of 514.5 nm by Spectra-Physics. The latex samples to be measured are diluted with water filtered at 0.2 μm on Millipore filter. The scattering measurement is carried out at room temperature (20° C.) at an angle of 90°. The latex particle diameter is obtained by the cumulant method.

Determination of the Dry Product Content (Polymer) in the Polymerization Latex 20 grams of latex are weighed in a glass beaker and placed in a stove to dry for 1 hour at 1500° C. The latex dry content is obtained from the formula:

Dry product %=weight after drying/latex initial weight*100.

Determination of the Polymer and of the Nonionic Surfactant Content in the Concentrated Dispersions About 1 gram of concentrated dispersion is weighed in an aluminum shuttle and dried in a stove for 1 hour at 105° C. The shuttle is weighed and introduced in a muffle at the temperature of 400° C. for 10 minutes (sintering). At the end the shuttle is weighed again.

The polymer content of the concentrated dispersion is obtained from the formula:

$$\text{Polymer \%} = \frac{\text{weight after sintering}}{\text{initial dispersion weight}} * 100$$

The nonionic surfactant content of the concentrated dispersion is obtained from the formula:

$$\text{surfactant \%} = \frac{\text{weight after drying} - \text{weight after sintering}}{\text{initial dispersion weight}} * 100$$

PFOA Determination

The quantitative determination of the PFOA content in the dispersion is carried out by the method described in "Encyclopedia of Industrial Chemistry Analysis", vol. 1, pages 339-340, Interscience Publishers, New York, N.Y., 1971, and in EP-A 194,690.

PFOA is converted into methyl ester and the ester content gaschromatografically analyzed. The method sensitivity limit is of 1 ppm.

Determination of the Cloud Point (CP) of a Nonionic Surfactant

The CP is determined according to the standard EN 1890 Method A, at concentration 1% w/w in water of the nonionic surfactant.

Determination of the Stability to Shear 300 ml of dispersion are placed in a Waring model laboratory blender having 1 liter volume beaker. The dispersion is subjected to strong stirring at 20,000 rpm. The time necessary to determine the dispersion coagulation under said conditions is determined.

Determination of the Specific Conductivity

The specific conductivity is determined at the temperature of 250° C., by Crison 525 conductimeter.

Determination of the Coagulum Amount Present in the Dispersion, Calculated with Respect to the Polymer 500 g of dispersion are filtered through a nylon net of known weight with mesh equal to 50 μ/m. At the end of the filtration 500 ml of water are let pass through the net to remove the dispersion in excess. The net with the possible residue is dried in a stove at 105° C. for 1 hour and then weighed. The coagulum amount is determined by the difference with respect to the initial weight of the net. By dividing the difference by the polymer amount contained in 500 g of dispersion and multiplying by 100, the coagulum percentage in the polymer is obtained.

The method sensitivity limit is 0.005% by weight on the polymer.

Example 1-a

Polymerization 11 grams of the aqueous solution of ammonium perfluorooctanoate at a concentration 100 g/liter and 31 liters of carefully degassed demineralized water are fed into a 50 liter autoclave equipped with a mechanical stirrer and previously put under vacuum. 140 grams of paraffin with softening point in the range 52° C.-54° C. were also previously introduced in the reactor. The autoclave is kept under mechanical stirring and is pressurized with TFE up to a pressure of 20 bar at a temperature of 68° C. At this point 500 ml of a solution of $(NH4)_2S_2O_8$ (APS) and disuccinic peroxide (DSAP) corresponding to 400 mg of APS and 2000 mg of DSAP are fed into the autoclave.

When the pressure in the reactor has decreased of 0.5 bar, one starts to feed TFE by a compressor so to maintain a constant pressure of 20 bar inside the reactor. In the meantime the internal reactor temperature is increased up to 78° C. at a speed of 0.5° C./min. During the reaction 50.6 grams of the aqueous solution at 100 g/liter of ammonium perfluorooctanoate are fed into the autoclave. After 90 minutes, the TFE feeding is interrupted, when 15,800 grams of TFE have reacted, the reactor evacuated and cooled. The discharged latex has a solid content equal to 30% w/w.

The diameter of the primary polymer particles determined by Laser Light Scattering (LLS) is equal to 248 nm. The PFOA content is 3,900 ppm with respect to the polymer.

Example 1-b

Purification and Concentration of the Latex Using as Surfactant Triton® X100

Step a)

In a 3 liter thermostatable reactor 1800 g of PTFE dispersion of the Example 1-a are introduced, having a solid content equal to 30% and a PFOA content equal to 3,900 ppm with respect to the polymer. As nonionic surfactant, Triton® X100 having CP=67° C. is used. 360 g of this surfactant at 25% by weight (16.7% by weight with respect to the polymer) and 9 g of ammonium sulphate solution at 10% by weight (0.-17% with respect to the polymer) are added to the dispersion. The mixture, homogeneous, has a specific conductivity at 25° C. equal to 1280 µS/cm and pH equal to 4.5. The mixture is heated to 68° C. under stirring. When this temperature is reached, the stirring is stopped and the mixture let decant for one hour at the same temperature. It is observed separation of a concentrated phase in polymer in the lower part of the reactor and of an upper phase rich in surfactant Triton® X100, substantially not containing PTFE.

At the end the mixture is let cool at room temperature and from the lower part of the reactor a concentrated dispersion is discharged, being free from coagula (<0.005% by weight on the polymer), having a polymer content of 69% by weight and a Triton® X100 content equal to 2% by weight. The PFOA content referred to the polymer is equal to 620 ppm. The upper phase present in the reactor, rich in surfactant Triton® X100, is treated with anionic exchange resins Amberjet®4400OH (Rohm & Haas) for the PFOA removal and reused in the process.

Step b)

750 g of the so obtained dispersion are introduced into a 3 liter thermostatable reactor. 240 g of Triton® X100 at 25% by weight, 750 g of demineralized water and 4.5 g of ammonium sulphate solution at 10% are added to the dispersion. The ammonium sulphate solution amount added in this step is lower than that of the previous step since the treated latex contains a residual amount of ammonium sulphate.

The total content in Triton® X100 is equal to 14.5% with respect to the polymer, while the specific conductivity of the mixture is equal to 1010 µS/cm, the pH equal to 8.3. The homogeneous mixture is heated to 67.5° C. under stirring.

At this point the same process described in the previous step is repeated finally recovering a concentrated dispersion, being free from coagula, having a polymer content equal to 71.5%, a Triton® X100 content equal to 2% and a PFOA content referred to the polymer equal to 150 ppm. The upper phase present in the reactor, rich in surfactant Triton® X100, is treated as mentioned above to be reused in the process.

Step c)

710 g of the so obtained dispersion are introduced in a 3 l thermostatable reactor. 280 g of Triton® X100 at 25%, 1,000 g of demineralized water and 4.5 g of ammonium sulphate solution at 10% are added to the dispersion. The total content in Triton® X100 is equal to 16.6% with respect to the polymer, while the specific conductivity of the mixture, appearing homogeneous, is equal to 950 µS/cm, the pH equal to 8.4. The mixture is heated to 67.5° C. under stirring.

At this point the same process described in the previous step is repeated finally recovering a concentrated dispersion, resulting coagula free, having a polymer content equal to 67% and a Triton® X100 content equal to 2.1%. The PFOA content referred to the polymer is equal to 42 ppm. The upper phase present in the reactor, rich in surfactant Triton® X100, is treated as mentioned above to be reused in the process.

Step d)

740 g of the so obtained dispersion are introduced in a 3 l thermostatable reactor. 290 g of Triton® X100 at 25%, 900 g of demineralized water and 3.2 g of ammonium sulphate solution at 10% are added to the dispersion. The total content in Triton® X100 is equal to 17.7% with respect to the polymer, while the mixture conductivity is equal to 810 µS/cm, the pH equal to 8.3. The homogeneous mixture is heated to 67° C. under stirring.

At this point the same process described in the previous step is repeated finally recovering a concentrated dispersion, being coagula free, having a polymer content equal to 69.9% and a Triton® X100 content equal to 2.1%. The PFOA content referred to the polymer is 11 ppm.

The upper phase present in the reactor, rich in surfactant Triton® X100, is treated as above to be reused in the process.

Step e)

700 g of the so obtained dispersion are introduced into a 3 l thermostatable reactor. 235 g of Triton® X100 at 25% by weight, 900 g of demineralized water and 3.1 g of ammonium sulphate solution at 10% are added to the dispersion. The total content in Triton® X100 is equal to 15% with respect to the polymer, while the mixture conductivity is equal to 790 µS/cm, the pH 8.5. The mixture, appearing homogeneous, is heated to 66.5° C. under stirring.

At this point the same process described in the previous step is repeated finally recovering a concentrated dispersion, being coagula free, having a polymer content equal to 69.9% and a Triton® X100 content equal to 2.1%. The PFOA content referred to the polymer is 3 ppm.

Step f)

690 g of the so obtained dispersion are introduced into a 3 l thermostatable reactor. 240 g of Triton® X100 at 25%, 900 g of demineralized water and 2.9 g of ammonium sulphate solution at 10% are added to the dispersion. The total content in Triton® X100 is equal to 15.4% with respect to the polymer, while the mixture conductivity is equal to 810 µS/cm, the pH 8.4. The mixture, appearing homogeneous, is heated to 66.5° C. under stirring.

At this point the same process described in the previous step is repeated finally recovering a concentrated dispersion, being coagula free, having a polymer content equal to 67.4% and a Triton® X100 content equal to 2.3%. The PFOA content referred to the polymer is <1 ppm.

Such dispersion has been formulated with a polymer content equal to 60% by weight and a Triton® X100 equal to 3% by weight with respect to the dispersion and it has been filtered on a 10 µm Pall filter. The filter results free from polymer residues. The stability to shear has been measured according to the above method. It has been found that the dispersion stability is of 5 min and 30 s, which represents a sufficiently high value to allow the use thereof in the usual applications of the PTFE dispersions.

The dispersion is pumpable by using a common peristaltic pump.

The specific conductivity of the concentrated dispersion before the phase separation, the cloud point, the percentage by weight of the polymer and of the nonionic surfactant and the PFOA ppm in the concentrated phase obtained after heating at CP obtained in steps a)-f) are summarized in Table 1.

Example 1-c

Purification and Concentration of the Latex Using as Surfactant Genapol® X 080

Step a)

In a 3 liter thermostatable reactor 1,800 g of the PTFE dispersion of the Example 1-a are introduced, having a solid content equal to 30% and a PFOA content of 3,900 ppm with respect to the polymer. As nonionic surfactant Genapol® X 080 having CP=46° C. is used. 360 g of the surfactant at 25% by weight (16.7% by weight with respect to the polymer) and 9 g of ammonium sulphate solution at 10% by weight (0.17% with respect to the polymer) are added to the dispersion. The mixture, homogeneous, has a specific conductivity at 250° C. equal to 1,340 µS/cm, the pH is 4.6. The mixture is heated to 49° C. under stirring. When said temperature is reached, the stirring is stopped and the mixture let decant for one hour at the same temperature. It is observed separation of a concentrated phase in polymer in the lower part of the reactor and of an upper phase rich in surfactant Genapol® X 080, substantially not containing PTFE. At the end the mixture is let cool at room temperature and from the lower part of the reactor a concentrated dispersion is discharged, being coagula free, having a polymer content of 70.5% by weight and a Genapol® X 080 content equal to 2.2% by weight. The PFOA content referred to the polymer is 640 ppm. The upper phase present in the reactor, rich in surfactant Genapol® X 080, is treated as indicated in the 1$^{st}$ step of Example 1-b to be reused in the process.

Step b)

750 g of the so obtained dispersion are introduced in a 3 liter thermostatable reactor. 260 g of Genapol® X 080 at 25% by weight, 750 g of demineralized water and 4.5 g of ammonium sulphate solution at 10% are added to the dispersion.

The total content in Genapol® X 080 is equal to 15.4% with respect to the polymer, while the specific conductivity of the mixture is 1,090 µS/cm, the pH is 8.6. The homogeneous mixture is heated to 48° C. under stirring.

At this point the same process described in the previous step is repeated finally recovering a concentrated dispersion, being coagula free, having a polymer content equal to 68.8%, a Genapol® X 080 content equal to 2.4% and a PFOA content referred to the polymer of 160 ppm. The upper phase present in the reactor, rich in surfactant Genapol® X 080, is treated as mentioned above to be reused in the process.

Step c)

755 g of the so obtained dispersion are introduced into a 3 l thermostatable reactor. 220 g of Genapol® X 080 at 25%, 1000 g of demineralized water and 4.5 g of ammonium sulphate solution at 10% are added to the dispersion. The total content in Genapol® X 080 is equal to 14.1% with respect to the polymer, while the specific conductivity of the mixture, homogeneous, is equal to 990 µS/cm, the pH is 8.5. The mixture is heated to 48° C. under stirring.

At this point the same process described in the previous step is repeated finally recovering a concentrated dispersion, being coagula free, having a polymer content equal to 67.7% and a Genapol® X 080 content equal to 2.2%. The PFOA content referred to the polymer is 48 ppm. The upper phase present in the reactor, rich in surfactant Genapol® X 080, is treated as above to be reused in the process.

Step d)

750 g of the so obtained dispersion are introduced into a 3 l thermostatable reactor. 300 g of Genapol® X 080 at 25%, 900 g of demineralized water and 2.8 g of ammonium sulphate solution at 10% are added to the dispersion. The total content in Genapol® X 080 is equal to 18% with respect to the polymer, while the specific conductivity of the mixture is 880 µS/cm, the pH is 8.5. The homogeneous mixture is heated to 48° C. under stirring.

At this point the same process described in the previous step is repeated finally recovering a concentrated dispersion, being coagula free, having a polymer content equal to 68%, a Genapol® X 080 content equal to 2.3%. The PFOA content referred to the polymer is 13 ppm.

The upper phase present in the reactor, rich in surfactant Genapol® X 080, is treated as mentioned above to be reused in the process.

Step e)

735 g of the so obtained dispersion are introduced into a 3 l thermostatable reactor. 280 g of Genapol® X 080 at 25%, 900 g of demineralized water and 2.9 g of ammonium sulphate solution at 10% are added to the dispersion. The total content in Genapol® X 080 is equal to 17.4% with respect to the polymer, while the specific conductivity of the mixture is equal to 840 µS/cm, the pH is 8.4. The mixture, which appears homogeneous, is heated to 47° C. under stirring. At this point the same process described in the previous step is repeated finally recovering a concentrated dispersion, being coagula free, having a polymer content equal to 68.5% and a Genapol® X 080 content equal to 2.3%. The PFOA content referred to the polymer is 4 ppm.

The dispersion has been formulated with a polymer content equal to 60% by weight and a Genapol® X 080 content equal to 3% by weight with respect to the dispersion and it has been filtered on a 10 μm Pall filter. The filter is polymer residue free. The stability to shear has been measured according to the above method. It has been found that the dispersion stability is of 5 min and 40 s, which represents a sufficiently high value to allow the use thereof in the common applications of the PTFE dispersions.

The dispersion is pumpable using a common peristaltic pump.

The specific conductivity of the concentrated dispersion before the phase separation; the cloud point, the percentage by weight of the polymer and of the nonionic surfactant and the PFOA ppm in the concentrated phase obtained after heating at CP obtained in steps a)-e) are summarized in Table 2.

Example 2 (Comparative)

Purification and Concentration of the Latex by Using as Surfactant Triton® X100 but not Adding Salt Step a)

In a 3 liter thermostatable reactor 1,800 g of the PTFE dispersion of the Example 1-a are introduced, having a solid content equal to 30% and a PFOA content equal to 3,900 ppm with respect to the polymer. As nonionic surfactant, Triton® X100 having CP=67° C. is used. 360 g of this surfactant at 25% by weight (16.7% by weight with respect to the polymer) are added to the dispersion. The mixture, homogeneous, has a specific conductivity at 25° C. equal to 370 μS/cm, the pH is 4.7. The mixture is heated to 76° C. under stirring to have the separation of the two phases. When this temperature is reached, the stirring is stopped and the mixture let decant for one hour at the same temperature. It is observed separation of a concentrated phase in polymer in the lower part of the reactor and of an upper phase rich in surfactant Triton® X100, substantially not containing PTFE.

At the end the mixture is let cool to room temperature and from the lower part of the reactor a concentrated dispersion is discharged, being coagula free, having a polymer content of 67.7% by weight and a Triton® X100 content equal to 1.7% by weight. The PFOA content referred to the polymer is equal to 800 ppm. The upper phase present in the reactor, rich in surfactant Triton® X100, is treated with anionic exchange resins Amberjet®4400OH (Rohm & Haas) for the PFOA removal and reused in the process.

Step b)

750 g of the so obtained dispersion are introduced into a 3 liter thermostatable reactor. 240 g of Triton® X100 at 25% by weight, 750 g of demineralized water are added to the dispersion.

The total content in Triton® X100 is equal to 14.3% with respect to the polymer, while the specific conductivity of the mixture is equal to 210 μS/cm, the pH is 8.6. The homogeneous mixture is heated to 70° C. under stirring to have the phase separation.

At this point the same process described in the previous step is repeated finally recovering a concentrated dispersion, being coagula free, having a polymer content equal to 62%, a Triton® X100 content equal to 1.7% and a PFOA content referred to the polymer equal to 315 ppm. The upper phase present in the reactor, rich in surfactant Triton® X100, is treated as above to be reused in the process.

Step c)

800 g of the so obtained dispersion are introduced into a 3 l thermostatable reactor. 280 g of Triton® X100 at 25%, 1000 g of demineralized water are added to the dispersion.

The total content in Triton® X100 is equal to 16.8% with respect to the polymer, while the specific conductivity of the mixture, homogeneous, is equal to 180 μS/cm, the pH is 8.6. The mixture is heated to 68° C. under stirring.

At this point the same process described in the previous step is repeated. At the end it is recovered with difficulty, owing to the high viscosity, a concentrated dispersion having the consistency of a gel, with a polymer content equal to 59% and a Triton® X100 content equal to 2.6%.

The coagulum amount is not determinable under these conditions.

The PFOA content with respect to the polymer is equal to 110 ppm.

The obtained dispersion is not pumpable and it is not possible to carry out a further purification step to remove further PFOA.

The specific conductivity of the concentrated dispersion before the phase separation, the cloud point, the percentage by weight of the polymer and of the nonionic surfactant and the PFOA ppm in the concentrated phase obtained after heating at CP obtained in steps a)-c) are summarized in Table 3.

Example 3 (Comparative)

Purification and Concentration of the Latex by Using as Surfactant Triton® X100 Under High Specific Conductivity Conditions Step a)

In a 3 liter thermostatable reactor 1800 g of the PTFE dispersion of the Example 1-a are introduced, having a solid content equal to 30% and a PFOA content equal to 3,900 ppm with respect to the polymer. As nonionic surfactant, Triton® X100 having CP=67° C. is used. 360 g of this surfactant at 25% by weight (16.7% by weight with respect to the polymer) and 180 g of ammonium sulphate solution at 10% by weight (3.3% with respect to the polymer) are added to the dispersion. The mixture, homogeneous, has a specific conductivity at 25° C. equal to 9,800 μS/cm, the pH is 4.4. The mixture is heated to 63° C. under stirring. When this temperature is reached, the stirring is stopped and the mixture let decant for one hour at the same temperature. It is observed separation of a concentrated phase in polymer in the lower part of the reactor and of an upper phase rich in surfactant Triton® X100, substantially not containing PTFE.

At the end the mixture is let cool at room temperature and from the lower part of the reactor a concentrated dispersion is discharged, containing a coagulum amount of 0.15% with respect to the polymer weight. The dispersion has a polymer content of 67% by weight and a Triton® X100 content equal to 2.4% by weight. The PFOA content referred to the polymer is equal to 740 ppm. The upper phase present in the reactor, rich in surfactant Triton® X100, is treated with anionic exchange resins Amberjet®4400OH (Rohm & Haas) for the PFOA removal and reused in the process.

Step b)

780 g of the so obtained dispersion are introduced into a 3 liter thermostatable reactor. 230 g of Triton® X100 at 25% by weight, 750 g of demineralized water and 140 g of ammonium sulphate solution at 10% are added to the dispersion.

The total content in Triton® X100 is equal to 14.6% with respect to the polymer, while the specific conductivity of the mixture is equal to 9,600 μS/cm, the pH is 8.3. The homogeneous mixture is heated to 63° C. under stirring.

At this point the same process described in the previous step is repeated finally recovering a concentrated dispersion, containing a coagulum amount of 2% by weight on the polymer. The dispersion has a polymer content equal to 62%, a Triton® X100 content equal to 2.7% and a PFOA content referred to the polymer of 210 ppm. The upper phase present in the reactor, rich in surfactant Triton® X100, is treated as above to be reused in the process.

Step c)

700 g of the so obtained dispersion are introduced into a 3 l thermostatable reactor. 230 g of Triton® X100 at 25%, 1,000 g of demineralized water and 130 g of ammonium sulphate solution at 10% are added to the dispersion. The total content in Triton® X100 is equal to 17.5% with respect to the polymer, while the specific conductivity of the mixture, homogeneous, is equal to 9,300 μS/cm, the pH is 8.3. The mixture is heated to 63° C. under stirring.

At this point the same process described in the previous step is repeated, finally recovering a concentrated dispersion, containing a coagulum amount equal to 8% by weight on the polymer. The dispersion has a polymer content equal to 61% and a Triton® X100 content equal to 2.1%. The PFOA content with respect to the polymer is equal to 80 ppm.

Such dispersion has been formulated with a polymer content equal to 60% by weight and a Triton® X100 content equal to 3% by weight with respect to the dispersion and it has been filtered on a 10 μm Pall filter. On the filter a remarkable amount of polymer residues is present. The stability to shear has been measured according to the above method. It has been found that the dispersion stability is of 2 min and 10 s, which represents a quite insufficient value to allow the use thereof in the usual applications of the PTFE dispersions.

The dispersion, after separation from the coagulum, is pumpable using a normal peristaltic pump.

The specific conductivity of the concentrated dispersion before the phase separation, the cloud point, the percentage by weight of the polymer and of the nonionic surfactant and the PFOA ppm in the concentrated phase obtained after heating at CP in steps a)-c) are summarized in Table 4.

TABLE 1

Results obtained in steps a)-f) of the Example 1-b.

| | Steps | | | | | |
|---|---|---|---|---|---|---|
| | a) | b) | c) | d) | e) | f) |
| Dispersion before the phase separation | | | | | | |
| Specific Conductivity (μS/cm) | 1280 | 1010 | 950 | 810 | 790 | 810 |
| Cloud Point (° C.) | 68 | 67.5 | 67.5 | 67 | 66.5 | 66.5 |
| Lower concentrated phase after the phase separation | | | | | | |
| Polymer weight % | 69 | 71.5 | 67 | 69,9 | 69,9 | 67.4 |
| Nonionic surfactant weight % | 2 | 2 | 2.1 | 2.1 | 2.1 | 2.3 |
| PFOA ppm on the polymer | 620 | 150 | 42 | 11 | 3 | <1 |
| Coagulum (% w/w) | <0.005 | <0.005 | <0.005 | <0.005 | <0.005 | <0.005 |

TABLE 2

Results obtained in steps) a)-e) of the Example 1-c.

| | Steps | | | | |
|---|---|---|---|---|---|
| | a) | b) | c) | d) | e) |
| Dispersion before the phase separation | | | | | |
| Specific Conductivity (μS/cm) | 1340 | 1090 | 990 | 880 | 840 |
| Cloud Point (° C.) | 49 | 48 | 48 | 48 | 47 |
| Lower concentrated phase after the phase separation | | | | | |
| Polymer weight % | 70.5 | 68.8 | 67.7 | 68 | 68.5 |
| Nonionic surfactant weight % | 2.2 | 2.4 | 2.2 | 2.3 | 2.3 |
| PFOA ppm on the polymer | 640 | 160 | 48 | 13 | 4 |
| Coagulum (% w/w) | <0.005 | <0.005 | <0.005 | <0.005 | <0.005 |

TABLE 3

Results obtained in steps a)-c) of the Example 2 (comparative)

| | Steps | | |
|---|---|---|---|
| | a) | b) | c) |
| Dispersion before the phase separation | | | |
| Specific Conductivity (μS/cm) | 370 | 210 | 110 |
| Cloud Point (° C.) | 76 | 70 | 68 |
| Lower concentrated phase after the phase separation | | | |
| Polymer weight % | 67.7 | 62 | 59 |

TABLE 3-continued

Results obtained in steps a)-c) of the Example 2 (comparative)

|  | Steps | | |
| --- | --- | --- | --- |
|  | a) | b) | c) |
| Nonionic surfactant weight % | 1.7 | 1.7 | 2.6 |
| PFOA ppm on the polymer | 800 | 315 | 110 |
| Coagulum (% w/w) | <0.005 | <0.005 | n.d. |

TABLE 4

Results obtained in steps a)-c) of the Example 3 (comparative)

|  | Steps | | |
| --- | --- | --- | --- |
|  | a) | b) | c) |
| Dispersion before the phase separation | | | |
| Specific Conductivity (µS/cm) | 9,800 | 9,600 | 9,300 |
| Cloud Point (° C.) | 63 | 63 | 63 |
| Lower concentrated phase after the phase separation | | | |
| Polymer weight % | 67 | 62 | 61 |
| Nonionic surfactant weight % | 2.4 | 2.7 | 2.1 |
| PFOA ppm on the polymer | 740 | 210 | 80 |
| Coagulum (% w/w) | 0.15 | 2 | 8 |

The invention claimed is:

1. A process for the preparation of pumpable fluoropolymer dispersions, free from anionic fluorinated surfactants, and with a coagulum amount <0.1% by weight referred to the polymer weight, comprising:

a)
step a1) adding:
  a nonionic surfactant having cloud point (CP) between 40° and 80° C., in an amount from 1.5% to 50% by weight on the dispersion fluoropolymer; and
  an electrolyte in an amount such to bring the specific conductivity of the dispersion, measured at 25° C., to values in the range 130-8,000 µS/cm; and
  optionally a buffer agent to have a pH between 2 and 12, to a fluoropolymer dispersion obtained by an emulsion polymerization process;
step a2):
  heating of the dispersion obtained in step a1), under stirring, up to a temperature $T_c$ in the range CP±10° C., CP being the cloud point of the used nonionic surfactant;
  decanting without stirring, by operating at the temperature $T_c$ until obtaining the dispersion separation in the following aqueous phases:
  a lower phase wherein the concentrated fluoropolymer is in the range 40% 75% w/w,
  a surnatant phase not containing fluoropolymer;
  surnatant separation;
  discharge of the lower phase containing the concentrated fluoropolymer;

b)
step b1):
  adding to the discharged dispersion obtained in step a2), after surnatant separation:
    optionally, an electrolyte in an amount such to bring the specific conductivity of the dispersion, measured at 25° C., to values in the range 130-8,000 µS/cm;
    a nonionic surfactant having cloud point (CP) in the range 40°-80° C., and such to be present in the dispersion in an amount from 1.5% to 50% by weight on the dispersion fluoropolymer;
    optionally, a buffer agent to have a pH in the range 2-12;
step b2):
  repeating the steps indicated in step a2);
optionally
c)
step c1):
  repeating step b1) but using the dispersion obtained in step b2);
step c2):
  repeating the steps indicated in step b2).

2. A process according to claim 1, wherein the fluoropolymer dispersions obtained by an emulsion or microemulsion polymerization process, have the following characteristics:
  particle diameter from 10 nm to 400 nm,
  fluoropolymer concentration from 10% to 45% by weight,
  amount of fluorinated anionic surfactant in the range 800 ppm-10,000 ppm, referred to the polymer weight.

3. A process according to claim 2, wherein the particle diameter is from 20 nm to 300 nm.

4. A process according to claim 2, wherein the fluoropolymer concentration is from 20% to 35%.

5. A process according to claim 2, wherein the amount of fluorinated anionic surfactant is in the range of 1,200 ppm-6,000 ppm.

6. A process according to claim 1, wherein the fluoropolymer dispersions obtained by an emulsion or microemulsion polymerization process are polytetrafluoroethylene (PTFE) dispersions wherein the amount of fluorinated anionic surfactant is in the range 2,500 ppm-5,000 ppm, referred to the polymer weight.

7. A process according to claim 6, wherein the amount of fluorinated anionic surfactant is in the range of 3,000-4,000 ppm.

8. A process according to claim 1, wherein when the surfactant amount in the initial dispersion, obtained by an emulsion or microemulsion polymerization process, is lower than about 3,000 ppm referred to the fluoropolymer weight, and the fluoropolymer concentration in the dispersion is about 30% by weight, steps a) and b) are carried out to obtain fluoropolymer dispersions which are anionic fluorinated surfactant free.

9. A process according to claim 1, wherein when the surfactant amount in the initial dispersion is higher than 3,000 ppm referred to the fluoropolymer weight and operating with a fluoropolymer concentration in the dispersion of about 30% by weight, three steps a), b) and c) are necessary.

10. A process according to claim 1, wherein the dispersions which are anionic fluorinated surfactant free contain a surfactant amount lower than 100 ppm referred to the polymer weight.

11. A process according to claim 1, comprising, in addition to steps a)-c), also the following one:
d)
step d1):
  repeating step c1) but by using the dispersion obtained in step c2);

step d2):
repeating the steps indicated in step c2).

12. A process according to claim 11, comprising, in addition to steps a), b), c), d) also step e) and optionally step f):
e)
step e1):
repeating step d1) but by using the dispersion obtained in step d2);
step e2):
repeating the steps indicated in step d2);
f)
step f1):
repeating step e1) but by using the dispersion obtained in step e2);
step f2):
repeating the steps indicated in step e2).

13. A process according to claim 1, wherein in steps a2), b2), c2), d2), e2), f2) the supernatant is purified to recover the surfactants by treatment with solid adsorbers.

14. A process according to claim 13, wherein the solid adsorbers are anionic exchange resins.

15. A process according to claim 1, wherein in steps a1), b1), c1), d1), e1), f1) one or more surfactants are used, the mixture of which has a CP value in the range indicated in a1).

16. A process according to claim 1, wherein the nonionic surfactants have a CP from 45° C. to 70° C.

17. A process according to claim 16, wherein the nonionic surfactants are selected from the group consisting of: polyethoxylated alcohols and polyethoxylated alkylphenols which can contain one or more propylene oxide units.

18. A process according to claim 16, wherein the nonionic surfactants are selected from the group consisting of:
t-$C_8H_{17}$—$C_6H_4$—$(OCH_2CH_2)_{9-10}OH$
sec-$C_{12}H_{25}$—$(OCH_2CH_2)_{10}OH$
iso-$C_{13}H_{27}$—$(OCH_2CH_2CH_2)$—$(OCH_2CH_2)_{10}$—OH
iso-$C_{13}H_{27}$—$(OCH_2CH_2)_{10}$—OH
iso-$C_{19}H_{27}$—$(OCH_2CH_2)_8$—OH.

19. A process according to claim 1, wherein the electrolytes used are ammonium salts or hydroxides and/or alkaline metals.

20. A process according to claim 19, wherein the electrolytes used are selected from ammonium sulphate, ammonium bisulphate, ammonium carbonate, or ammonium hydroxide.

21. A process according to claim 1, wherein the fluoropolymers of the dispersions obtained by emulsion or microemulsion polymerization are the TFE copolymers or PTFE homopolymers.

22. A process according to claim 1, wherein the pumpable fluoropolymer dispersions are based on tetrafluoroethylene (TFE) homopolymers or copolymers.

23. A process according to claim 1, wherein the pumpable fluoropolymer dispersions have a coagulum amount <0.01% by weight.

24. A process according to claim 1, wherein the pumpable fluoropolymer dispersions have a coagulum amount <0.005% by weight.

25. A process according to claim 1, wherein the nonionic surfactant is in an amount from 2.5% to 30% by weight.

26. A process according to claim 1, wherein the electrolyte is in an amount such to bring the specific conductivity of the dispersion, measured at 25° C., to values in the range of 250-3,000 μS/cm.

27. A process according to claim 1, wherein the heating of the dispersion occurs up to a temperature $T_c$ in the range CP±5° C.

* * * * *